(12) United States Patent
Kwon et al.

(10) Patent No.: US 8,654,625 B2
(45) Date of Patent: Feb. 18, 2014

(54) METHOD AND APPARATUS FOR TRANSMITTING DATA PERFORMED BY AT LEAST ONE BASE STATION IN WIRELESS COMMUNICATION SYSTEM

(75) Inventors: Yeong Hyeon Kwon, Gyeongki-do (KR); Dong Guk Lim, Gyeongki-do (KR); Han Gyu Cho, Gyeongki-do (KR); Jae Hoon Chung, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 127 days.

(21) Appl. No.: 13/141,512

(22) PCT Filed: Feb. 1, 2010

(86) PCT No.: PCT/KR2010/000597
§ 371 (c)(1),
(2), (4) Date: Jun. 22, 2011

(87) PCT Pub. No.: WO2010/087665
PCT Pub. Date: Aug. 5, 2010

(65) Prior Publication Data
US 2011/0255501 A1    Oct. 20, 2011

Related U.S. Application Data

(60) Provisional application No. 61/149,014, filed on Feb. 2, 2009.

(51) Int. Cl.
*H04J 11/00* (2006.01)
*H04W 4/00* (2009.01)

(52) U.S. Cl.
USPC .......................................... 370/208; 370/328

(58) Field of Classification Search
None
See application file for complete search history.

(56) References Cited

U.S. PATENT DOCUMENTS

| | | | | |
|---|---|---|---|---|
| 5,754,626 A | * | 5/1998 | Otonari | 370/347 |
| 5,848,103 A | * | 12/1998 | Weerackody | 455/103 |
| 7,693,106 B1 | * | 4/2010 | Ishikawa et al. | 370/331 |
| 2002/0004396 A1 | * | 1/2002 | Shibasaki | 455/436 |
| 2003/0067866 A1 | | 4/2003 | Jung | |
| 2003/0202460 A1 | | 10/2003 | Jung et al. | |
| 2005/0105460 A1 | * | 5/2005 | Suh et al. | 370/203 |
| 2005/0122917 A1 | * | 6/2005 | Tiedemann, Jr. | 370/300 |
| 2006/0126566 A1 | * | 6/2006 | Pekonen | 370/331 |
| 2006/0209883 A1 | * | 9/2006 | Suzuki | 370/465 |
| 2007/0002725 A1 | * | 1/2007 | Nystrom et al. | 370/208 |
| 2007/0177493 A1 | * | 8/2007 | Lin et al. | 370/208 |
| 2008/0049602 A1 | | 2/2008 | Jung et al. | |
| 2008/0101212 A1 | * | 5/2008 | Yu et al. | 370/208 |

OTHER PUBLICATIONS

International Search Report from PCT/KR2010/000597 (PCT corresponding to present application).

* cited by examiner

*Primary Examiner* — Gregory B Sefcheck
*Assistant Examiner* — Joshua Smith
(74) *Attorney, Agent, or Firm* — Morgan, Lewis & Bockius LLP (57) ABSTRACT

A method and apparatus for transmitting data performed by at least one base station (BS) in a wireless communication system is provided. First signals are respectively mapped to a first Orthogonal Frequency Division Multiplexing (OFDM) symbol of a first BS and a second BS, and are transmitted. A second signal, having a θ shifted phase of the first signal, is mappped to a second OFDM symbol, and is transmitted by the first BS. The respective first signals and the second signal are transmitted in a same subcarrier in a frequency domain.

10 Claims, 5 Drawing Sheets

# METHOD AND APPARATUS FOR TRANSMITTING DATA PERFORMED BY AT LEAST ONE BASE STATION IN WIRELESS COMMUNICATION SYSTEM

The present application is a national stage of PCT International Application No. PCT/KR2010/000597 filed Feb. 1, 2010, and claims the benefit of U.S. Provisional Application No. 61/149,014, filed Feb. 2, 2009.

TECHNICAL FIELD

The present invention relates to wireless communications, and more particularly, to a method and apparatus for transmitting data performed by at least one base station in a wireless communication system.

BACKGROUND ART

The next-generation multimedia wireless communication systems which are being actively researched are required to process various pieces of information, such as video and wireless data, in addition to the early voice-centered service with a higher data transmission rate. The 4th generation wireless communication systems which are now being developed, following the 3rd generation wireless communication systems, are aiming at supporting the high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler effect resulting from the mobility of a user equipment. A variety of techniques are being developed in order to overcome the abnormal characteristics of the wireless channel and to increase the reliability of wireless communication.

Technology for supporting reliable and high-speed data service includes Orthogonal Frequency Division Multiplexing (OFDM), Multiple Input Multiple Output (MIMO), and so on. An OFDM system is being taken into consideration after the 3rd generation systems which are able to attenuate the ISI effect with low complexity. The OFDM system converts symbols, received in series, into N (N is a natural number) parallel symbols and transmits them on respective separated N subcarriers. The subcarriers maintain their orthogonality in the frequency domain. It is expected that the market for mobile communications will shift from the existing Code Division Multiple Access (CDMA) systems to OFDM-based systems. MIMO technology is used to improve the efficiency of data transmission and reception using multiple transmit antennas and multiple receive antennas. The MIMO technology includes spatial multiplexing, transmit diversity, beam-forming and the like. A MIMO channel matrix depending on the number of receive antennas and the number of transmit antennas can be decomposed into a number of independent channels. Each of the independent channels is referred to as a layer or a stream. The number of layers is referred to as a rank.

If neighbor cells of the OFDM/OFDMA systems use the same subcarrier in multi-cell environments, it can become a cause of interference to users. Such a phenomenon is referred to as inter-cell interference. In particular, such inter-cell interference becomes a big problem to a user equipment disposed near the boundary of cells. In downlink transmission, a user equipment disposed near the boundary of a cell is subject to strong interference resulting from neighbor cells. In uplink transmission, a user equipment disposed near the boundary of a cell provides strong interference to neighbor cells and also has a low transmission rate because of the loss of a path in a serving cell. To reduce such inter-cell interference, neighbor cells can use different subcarriers. This method is, however, problematic in that radio resources which can be used by the base stations of the respective cells are reduced.

A Coordinated Multi-Point (CoMP) transmission/reception scheme is used to increase the data rate and to improve the throughput of cell boundary or the entire system. Several discussions over a method of transmitting and receiving data using the CoMP scheme are in progress. Downlink CoMP transmission is a common terminology, denoting various types of downlink transmission coordination from multiple transmission points which are geographically spaced apart from each other. Downlink CoMP is a relatively general term referring to different types of coordination in the downlink transmission from multiple geographically separated transmission points (TP). This includes coordination in the scheduling between geographically separated transmission points and joint transmission from geographically separated transmissions points. Uplink CoMP reception is a relatively general term referring to different types of coordination in the uplink reception at multiple, geographically separated points. This includes coordination in the scheduling, including any beam-forming functionality, between geographically separated reception points.

In the case in which, as in the CoMP scheme, signals are transmitted by multiple points, a receiver can receive the signals which are overlapped with each other if the signals are not synchronized. Accordingly, orthogonality between the signals is not maintained, and the received signals function as mutual interference.

Accordingly, there is a need for the structure of a signal and a method of transmitting data, which are capable of preventing received signals from interfering with each other and also maintaining orthogonality between the signals.

DISCLOSURE OF INVENTION

Technical Problem

The present invention provides a method and apparatus for transmitting data performed by at least one base station in a wireless communication system.

Solution to Problem

In an aspect, a method for transmitting data performed by at least one base station (BS) in a wireless communication system is provided. The method include transmitting respective first signals of a first BS and a second BS, the respective first signals being mapped to a first Orthgonal Frequency Division Multiplexing (OFDM) symbol, and transmitting a second signal having a θ shifted phase of the first signal, by the first BS, the second signal being mapped to a second OFDM symbol, wherein the respective first signals and the second signal are transmitted in a same subcarrier in a frequency domain. The θ may be $$\theta = 2\pi f_k t_{CP} \text{ or } -2\pi f_k t_{CP}$$

, where $f_k$ is a frequency of the subcarrier in which the respective first signals and the second signal are transmitted, and $t_{CP}$ is a length of a cyclic prefix applied to an OFDM symbol. The method may further include transmitting the first signal of the second BS, by the second BS, the first signal of the second BS being mapped to the second OFDM symbol. The method may further include transmitting the second signal of the second BS, by the second BS, the second signal of the second BS being mapped to the second OFDM symbol. The respective first signals and the second signal may be reference signals. A guard subcarrier may be allocated, which is contiguous to the subcarrier in which the respective first signals and the second signal are transmitted. The method may further include transmitting a data symbol mapped to the first OFDM symbol of the guard subcarrier, and transmitting a phase-modulated data symbol mapped to the second OFDM symbol, the phase-modulated data symbol having a θ shifted phase of the data symbol.

In another aspect, a method of processing data performed by a user equipment in a wireless communication system is provided. The method include receiving a first signal from a BS through a first OFDM symbol, receiving a second signal, having a θ shifted phase of the first signal, from the BS through a second OFDM symbol contiguous to the first OFDM symbol, and decoding the first signal and the second signal. The θ may be $$\theta = 2\pi f_k t_{CP} \text{ or } -2\pi f_k t_{CP}$$

, where $f_k$ is a frequency of the subcarrier in which the first signal and the second signal are transmitted, and $t_{CP}$ is a length of a cyclic prefix applied to an OFDM symbol. Decoding the first signal and the second signal may further include setting a useful symbol interval within the first OFDM symbol and the second OFDM symbol, and decoding data within the useful symbol interval. A length of the useful symbol interval may be a length other than a cyclic prefix in the second OFDM symbol.

In another aspect, a transmitter in a wireless communication system is provided. The transmitter include a Radio Frequency (RF) unit configured to transmit and receive signals, and a processor coupled to the RF unit and configured to map a first signal to a first OFDM symbol and transmit the first signal mapped to the first OFDM symbol, map a second signal, having a phase θ shifted phase of the first signal, to a second OFDM symbol contiguous to the first OFDM symbol and transmit the second signal mapped to the second OFDM symbol, wherein the first signal and the second signal are transmitted in a same subcarrier in a frequency domain. the θ may be $$\theta = 2\pi f_k t_{CP} \text{ or } -2\pi f_k t_{CP}$$

, where $f_k$ is a frequency of the subcarrier in which the first signal and the second signal are transmitted, and $t_{CP}$ is a length of a cyclic prefix applied to an OFDM symbol. The first signal and the second signal may be reference signals.

Advantageous Effects of Invention

According to the present invention, a receiver maintains orthogonality between reference signals transmitted by multiple points and estimates a channel based on the reference signals. Accordingly, a channel can be more accurately estimated.

MODE FOR THE INVENTION

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16(WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

LTE/LTE-A is chiefly described as an example in order to clarify the description, but the technical spirit of the present invention is not limited to LTE/LTE-A.

Figure 1:
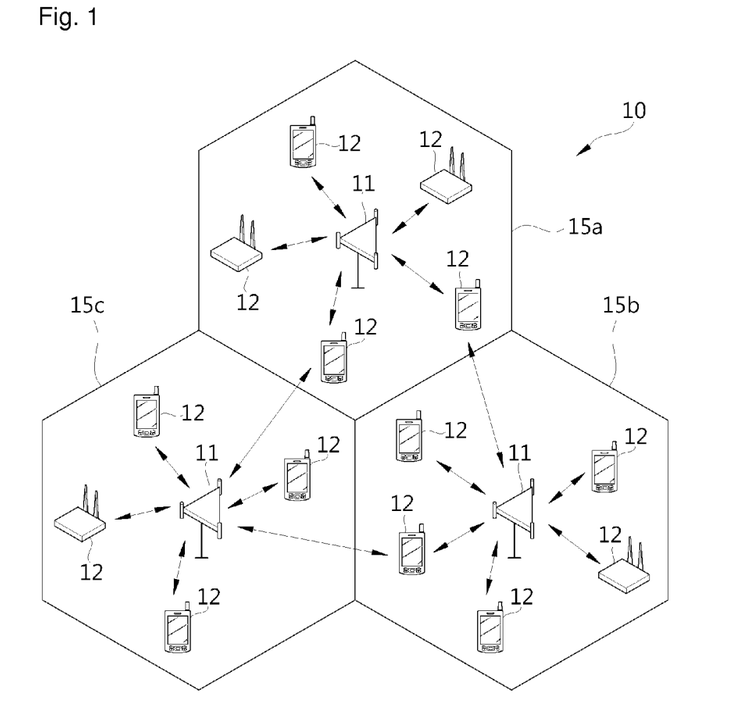
FIG. 1 illustrates a wireless communication system.

FIG. 1 shows a wireless communication system.
The wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
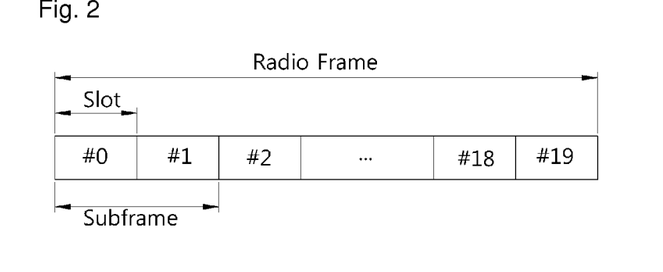
FIG. 2 illustrates the structure of a radio frame in the 3GPP LTE specifications.

FIG. 2 shows the structure of a radio frame in the 3GPP LTE specifications. For the radio frame structure, reference can be made to Paragraph 5 of 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)".

Referring to FIG. 2, the radio frame includes ten subframes, and one subframe includes two slots. The slots within the radio frame are allocated slot numbers from #0 to #19. The time that it takes to transmit one subframe is called a Transmission Time Interval (TTI). The TTI can be called a scheduling unit for data transmission. For example, the length of one radio frame can be 10 ms, the length of one subframe can be 1 ms, and the length of one slot may be 0.5 ms.

One slot includes a plurality of Orthogonal Frequency Division Multiplexing (OFDM) symbols in the time domain and a plurality of subcarriers in the frequency domain. The OFDM symbol is used to represent one symbol period because the 3GPP LTE specifications use OFDMA in the downlink. The OFDM symbol can be called another terminology according to the multi-access method. For example, in the case in which SC-FDMA is used as an uplink multi-access method, corresponding symbols can be called SC-FDMA symbols. A Resource Block (RB) is the unit of resource allocation, and it includes a plurality of consecutive subcarriers in one slot. The structure of a radio frame is only an example. The number of subframes included in a radio frame, the number of slots included in a subframe, or the number of OFDM symbols included in a slot can be changed in various ways.

In the 3GPP LTE specifications, one slot is defined to include seven OFDM symbols in a normal Cyclic Prefix (CP), and one slot is defined to include six OFDM symbols in the extended CP.

Figure 3:
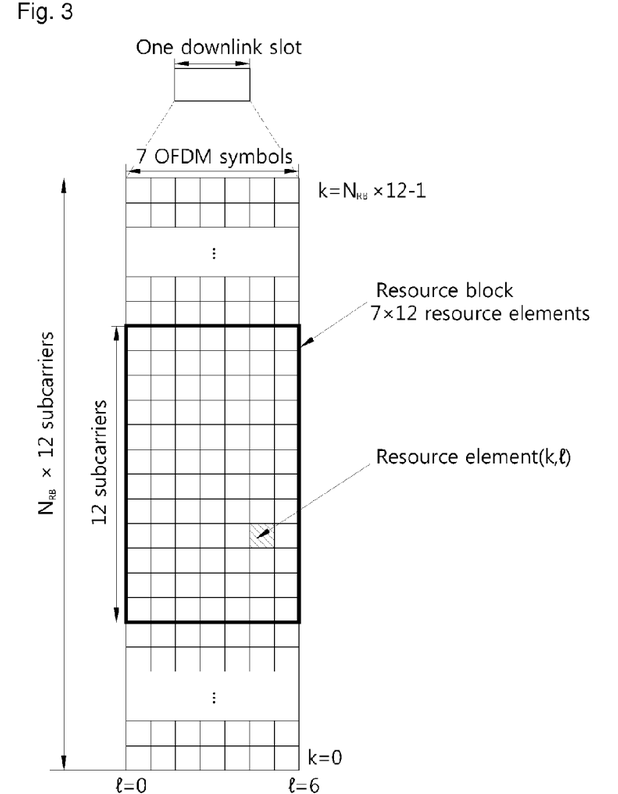
FIG. 3 shows an example of a resource grid for one downlink slot.

FIG. 3 shows an example of a resource grid for one downlink slot.

The downlink slot includes a plurality of OFDM symbols in the time domain and $N_{RB}$ resource blocks in the frequency domain. The number of resource blocks $N_{RB}$ included in a downlink slot is dependent on a downlink transmission bandwidth set in a cell. For example, in the LTE system, the number of resource blocks $N_{RB}$ may be one of 60 to 110. One resource block includes a plurality of subcarriers in the frequency domain. The structure of an uplink slot can be identical with that of the downlink slot.

Each of elements on the resource grid is called a resource element. The resource element on the resource grid can be identified by an index pair (k, l) within a slot. Here, k(k=0, . . . , $N_{RB}$*12−1) denotes a subcarrier index in the frequency domain, and l (l=0, . . . , 6) denotes an OFDM symbol index in the time domain.

In this case, one resource block is illustrated to include 7*12 resource elements, including 7 OFDM symbols in the time domain and 12 subcarriers in the frequency domain. However, the number of OFDM symbols and the number of subcarriers within a resource block are not limited to the 7*12 resource elements. The number of OFDM symbols and the number of subcarriers can be variously changed depending on the length of a CP, frequency spacing, and so on. For example, in the normal CP, the number of OFDM symbols can be 7, and in the extended CP, the number of OFDM symbols can be 6.

In one OFDM symbol, the number of subcarriers can be one of 128, 256, 512, 1024, 1536, and 2048.

Figure 4:
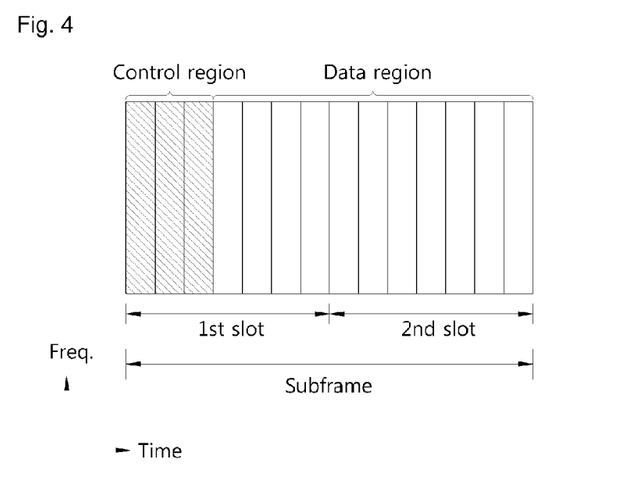
FIG. 4 illustrates the structure of a downlink subframe.

FIG. 4 shows the structure of a downlink subframe.

The downlink subframe includes two slots in the time domain. Each of the slots includes 7 OFDM symbols in the normal CP. A maximum of three OFDM symbols of the first slot within the subframe correspond to a control region to which control channels are allocated, and the remaining OFDM symbols correspond to a data region to which Physical Downlink Shared Channels (PDSCHs) are allocated. Downlink control channels used in the 3GPP LTE include a Physical Control Format Indicator Channel (PCFICH), a Physical Downlink Control Channel (PDCCH), a Physical Hybrid-ARQ Indicator Channel (PHICH), and so on. The PCFICH transmitted in the first OFDM symbol of a subframe carries information about the number of OFDM symbols (that is, the size of a control region) which is used to transmit control channels within the subframe. The PHICH carries an Acknowledgement (ACK)/Non-Acknowledgement (NACK) signal for an uplink Hybrid Automatic Repeat Request (HARM). In other words, an ACK/NACK signal for uplink data transmitted by a user equipment is transmitted on the PHICH. Control information transmitted through the PDCCH is called Downlink Control Information (DCI). The DCI indicates uplink or downlink scheduling information, an uplink transmission power control command for specific user equipment groups, etc.

Figure 5:
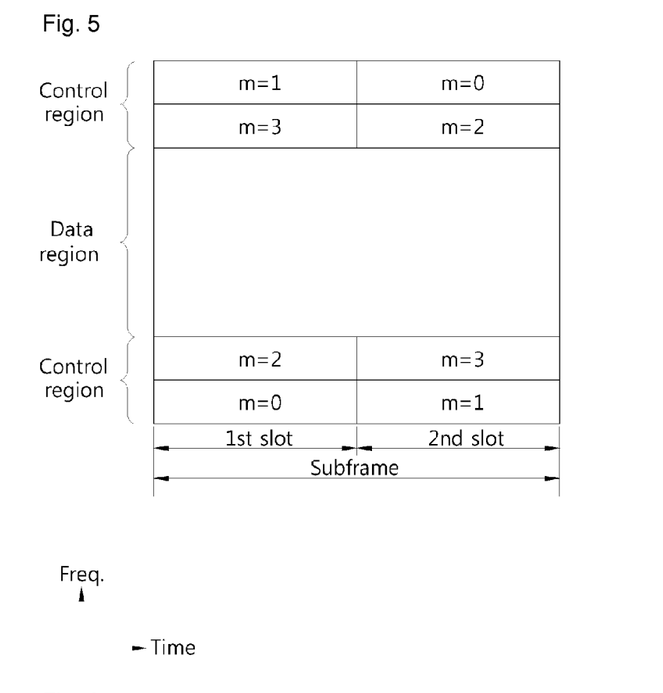
FIG. 5 illustrates the structure of an uplink subframe.

FIG. 5 shows the structure of an uplink subframe.

The uplink subframe can be divided into a control region and a data region in the frequency domain. The control region is allocated with a Physical Uplink Control Channel (PUCCH) on which uplink control information is transmitted. The data region is allocated with a Physical Uplink Shared Channel (PUSCH) on which data are transmitted. To maintain the characteristic of a single carrier, a user equipment does not transmit the PUCCH and the PUSCH at the same time. The PUCCHs of one user equipment forms a RB pair within a subframe and are then allocated. The RBs included in the RB pair occupy different subcarriers of respective slots. It is said that a RB pair allocated to a PUCCH is frequency-hopped at the slot boundary.

In wireless communication systems, an uplink channel or a downlink channel needs to be estimated for the purpose of the transmission and reception of data, the acquisition of system synchronization, the feedback of channel information, etc. In wireless communication system environments, fading is generated because of multi-path time delay. A process of restoring a transmission signal by compensating for the distortion of the transmission signal resulting from a sudden change in environments, caused by such fading, is referred to as channel estimation. Such channel estimation is, in general, performed using a reference signal which is known to both a transmitter and a receiver. The reference signal is also referred to as a pilot. A subcarrier used to transmit the reference signal is referred to as a reference signal subcarrier, and a resource element used to transmit data is referred to as a data subcarrier.

A certain sequence may be used as a sequence for the reference signal (hereinafter referred to as a RS sequence) without special restrictions. A sequence generated by a Phase Shift Keying (PSK)-based computer may be used as the RS sequence. PSK may include, for example, Binary Phase Shift Keying (BPSK) and Quadrature Phase Shift Keying (QPSK). In an alternative example, a Constant Amplitude Zero Auto-Correlation (CAZAC) sequence may be used as the RS sequence. The CAZAC sequence may include, for example, a Zadoff-Chu (ZC)-based sequence, a ZC sequence with cyclic extension, and a ZC sequence with truncation. In another alternative example, a Pseudo-random (PN) sequence may be used as the RS sequence. The PN sequence may include, for example, an m-sequence, a computer-generated sequence, a Gold sequence, and a Kasami sequence. In yet another alternative example, a cyclically shifted sequence may be used as the RS sequence.

The reference signal may be classified into a common reference signal and a dedicated reference signal. The common reference signal is transmitted to all user equipments within a cell and used for channel estimation. The dedicated reference signal is received by a specific user equipment or a specific group of user equipments within a cell and used to demodulate data by a specific user equipment or a specific group of user equipments.

Some embodiments of a proposed data transmission method are described below.

In the case in which signals are received from multiple points according to the CoMP scheme, synchronization between the signals transmitted by the multiple points may not be established. In the case in which CDMA is used as a base for spreading, signals transmitted by respective transmission points may be restored by despreading a sequence for each transmission point. Meanwhile, in the case in which OFDMA is used as a base for spreading, signals transmitted by multiple points may be accurately restored if a difference in the synchronization of the time or frequency of the signals falls within a certain level. In time delay, the certain level may be the length of a cyclic prefix (CP). In other words, in the case in which the time delay of signals transmitted by multiple points is more than the length of a cyclic prefix, the signals act to interfere with each other, which results in non-orthogonality between subcarriers. Accordingly, the performance of channel estimation through a reference signal is deteriorated, and the performance of detecting and decoding a data symbol may be reduced. To prevent the problems, a method of using a cyclic prefix having a longer length or controlling points of time at which signals are respectively transmitted by multiple points may be taken into consideration such that all the signals can be received within the length of a cyclic prefix. If a cyclic prefix having a longer length is used, the throughput of a user equipment not using the CoMP scheme may be reduced, and it is also difficult to flexibly control a point of time at which a specific user equipment using the CoMP scheme sends a downlink signal. Accordingly, there is a need for a transmission method which has a structure compatible with signal structures, used by user equipments not using the CoMP scheme, and restores signals transmitted by user equipments using the CoMP scheme, without distortion.

Figure 6:
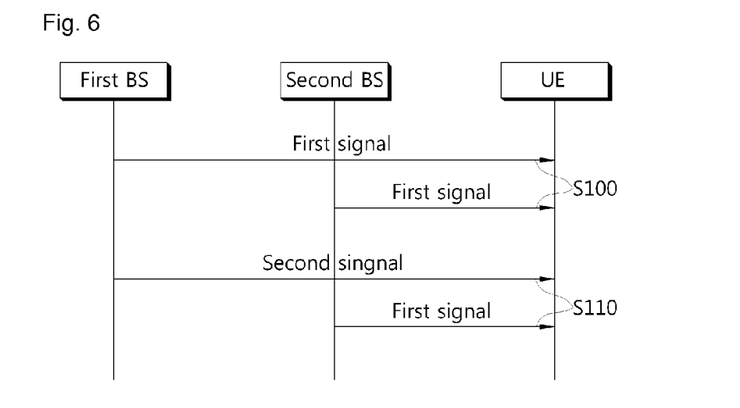
FIG. 6 illustrates an embodiment of a proposed data transmission method.

FIG. 6 illustrates an embodiment of a proposed data transmission method. Although, in the present embodiment, 2 OFDM symbols are illustrated, the number of OFDM symbols is not limited to 2, but may be variously increased.

A first OFDM symbol is illustrated at step S100. A first Base Station (BS) maps a first signal to the first OFDM symbol and transmits the first signal to a User Equipment (UE). A second BS maps the first signal to the first OFDM symbol and transmits the first signal to the UE. The first signal transmitted by the first BS and the first signal transmitted by the second BS are transmitted in the same subcarrier.

A second OFDM symbol is illustrated at step S110. The second OFDM symbol may be contiguous to the first OFDM symbol. The first BS maps a second signal, having a phase of the first signal shifted by θ, to the second OFDM symbol and transmits the second signal to the UE. The second BS maps the first signal to the second OFDM symbol and sends the first signal to the UE. The signal transmitted by the second BS may be the second signal. The first signal and the second signal, transmitted at step S110, are transmitted in the same subcarrier as the first signals which are transmitted by the first BS and the second BS at step S100.

θ can be expressed by Equation 1.

MathFigure 1

$$\theta = 2\pi f_k t_{CP} \text{ or } -2\pi f_k t_{CP} \quad [\text{Math.1}]$$

In Equation 1, $f_k$ is the frequency of a subcarrier, and $t_{CP}$ is the length of a cyclic prefix which is applied to OFDM symbols. That is, θ is varied depending on the frequency of a subcarrier and the length of a cyclic prefix and is increased in proportion to an increase in the number of OFDM symbols. In the case in which, as described above, a signal is transmitted with its phase shifted in contiguous OFDM symbols, the length of a cyclic prefix may be arbitrarily expanded in a corresponding subcarrier.

The second signal transmitted in the second OFDM symbol can be expressed in the time domain using Equation 2.

Math Figure 2

$$\begin{aligned} S_2(t) &= ae^{j2\pi f_k(t+t_{CP})} \\ &= a \times e^{j2\pi f_k t} \times e^{j2\pi f_k t_{CP}} \\ &= a \times e^{j2\pi f_k t} \times e^{j\theta} \end{aligned} \quad [\text{Math. 2}]$$

Figure 7:
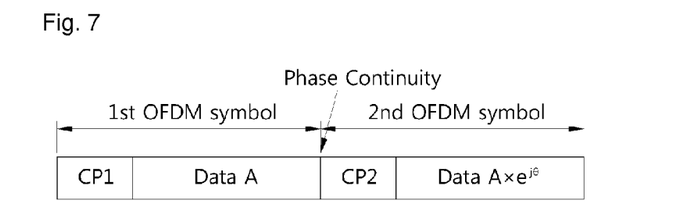
FIG. 7 shows an example of the structure of a signal for the proposed data transmission method.

FIG. 7 shows an example of the structure of a signal for the proposed data transmission method.

Data A are mapped to a first OFDM symbol and then transmitted. Data $A*e^{j\theta}$ having a phase of the data A shifted by θ are mapped to a second OFDM symbol and then transmitted. When phase continuity between the first OFDM symbol and the second OFDM symbol is maintained as described above, a receiver can very flexibly set the useful symbol interval of an OFDM symbol from the first OFDM symbol and the second OFDM. This is because the data $A*e^{j\theta}$ mapped to the second OFDM symbol and transmitted correspond to data having only the phase of the data A, mapped to the first OFDM symbol and transmitted, shifted. The receiver may set the useful symbol interval and decode the data. The length of the useful symbol interval may be a length not including a cyclic prefix in an OFDM symbol. In this case, if a specific interval is set as the useful symbol interval, the remaining regions may be treated like the cyclic prefix. Accordingly, the time delay effect of signals transmitted by multiple points can be prevented.

The signal structure of FIG. 7 may be applied to a reference symbol or a data symbol. The reference symbol indicates the symbol of a reference signal used for channel estimation, etc. When the structure of a signal in which phase continuity is maintained, such as that shown in FIG. 7, is applied to the reference symbol, a receiver can maintain orthogonality between signals transmitted by multiple points. Accordingly, a channel can be more accurately measured. A receiver to which the CoMP scheme is applied can set a useful symbol interval based on the time delay of signals transmitted by multiple points and extract information about respective transmission points based on the set useful symbol interval. The signal structure shown in FIG. 7 may also be applied to data symbols. In this case, the throughput may be reduced because the same data are transmitted in two or more OFDM symbols. For this reason, the structure of a signal in which phase continuity is maintained, such as that shown in FIG. 7, can be applied to data symbols only when the throughput is very great.

Figure 8:
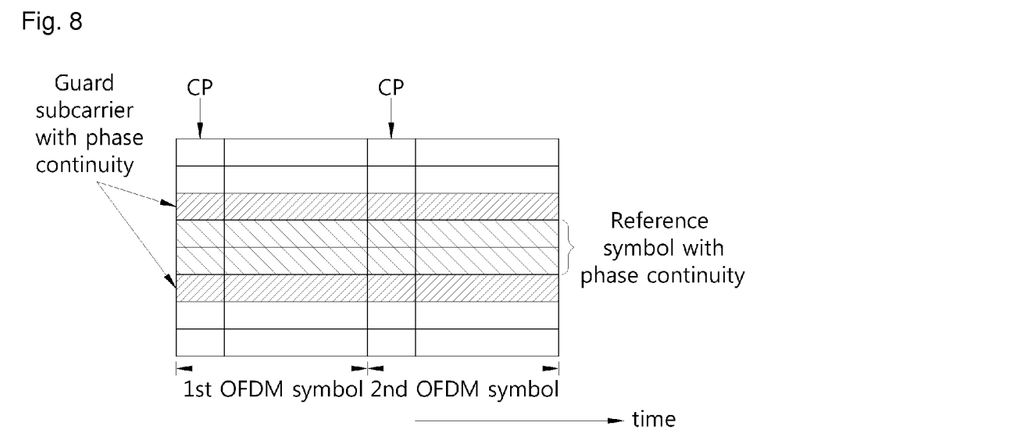
FIG. 8 shows another example of the structure of a signal for the proposed data transmission method.

FIG. 8 shows another example of the structure of a signal for the proposed data transmission method.

In the case in which the structure of a signal is a reference symbol, subcarriers neighboring a subcarrier in which the reference symbol is transmitted can act to interfere with the reference symbol. It is therefore necessary to apply the structure of a signal to subcarriers neighboring a subcarrier in which the reference symbol is transmitted. Referring to FIG. 8, two neighboring subcarriers are allocated to a subcarrier used to transmit a reference symbol. The subcarrier used to transmit the reference symbol may have the structure of a signal in which phase continuity is maintained. The subcarrier, used to transmit the reference symbol, and the two neighboring subcarriers are allocated as guard subcarrier. The guard subcarrier can also have the structure of a signal in which phase continuity is maintained. Nothing signal may be transmitted or data symbols may be transmitted in the guard subcarrier. In general, since it is advantageous to transmit data symbols in terms of the utilization of resources, the data symbols may be transmitted using the structure of a signal shown in FIG. 7. Accordingly, the structure of a signal in which phase continuity is maintained can be suitably applied to the reference symbols. In particular, the structure of a signal in which phase continuity is maintained can be suitably applied to the common reference signal which must be transmitted by each transmission point and is used for pertinent UEs to estimate a channel in common.

In the case in which the structure of radio resources to which the CoMP scheme will be applied is provided, a method of using the structure of a signal, having a cyclic prefix with a longer length, may be used in order to prevent the influence of time delay resulting from signals transmitted by multiple points. For example, a CoMP scheme using specific resource regions, such as a Multicast Broadcast Single Frequency Network (MBSFN) subframe, defined in the 3GPP LTE-A specification, or CoMP-dedicated radio resources, may be used. To prevent the influence of time delay of the signals transmitted by the multiple points, the structure of a signal in which the length of a cyclic prefix has been extended may be taken into consideration.

Figure 9:
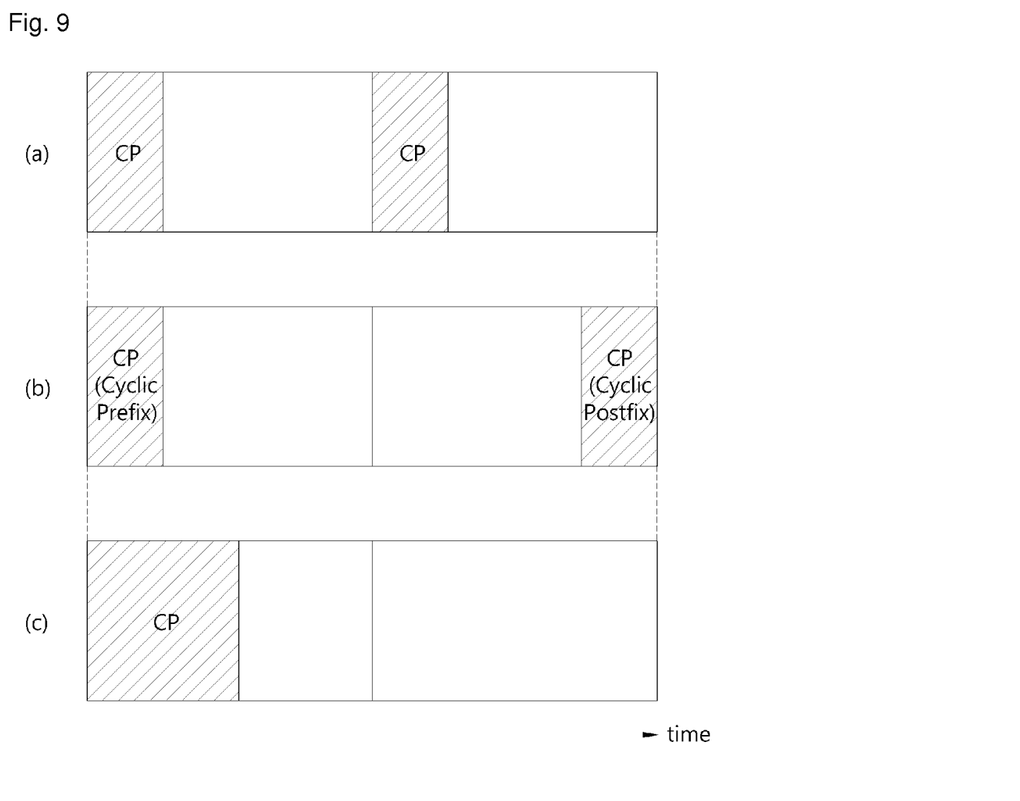
FIG. 9 shows an example of a CoMP unit.

FIG. 9 shows an example of a CoMP unit. The CoMP unit indicates the structure of a signal in which the length or position of a cyclic prefix has been changed. It is to be noted that, although the CoMP unit of FIG. 9 is illustrated to include two symbols, the number of symbols included in the CoMP unit is not limited to 2.

FIG. 9(a) shows a common signal structure. Two symbols of this figure have respective cyclic prefixes each having a certain length.

In FIG. 9(b), the first symbol of the two symbols has a cyclic prefix, and the second symbol thereof has a cyclic postfix. In each of the first symbol and the second symbol, data may be transmitted on a symbol basis in the useful symbol interval other than the cyclic prefix. The data transmitted in the two symbols may be identical with each other or different from each other, which illustrates an example in which the symbols are separately generated. In an alternative example, the useful symbol interval of the first symbol and the useful symbol interval of the second symbol may be used as one symbol. The CoMP unit of the present embodiment is advantageous in that timing of the existing symbol structure remains intact, whereas, in the case in which different data are transmitted in respective symbols, the CoMP unit of the present embodiment is disadvantageous in that processing complexity of a receiver which has received the symbols may be increased.

In FIG. 9(c), a CoMP unit includes a cyclic prefix, corresponding to the sum of a cyclic prefix of the first symbol and a cyclic prefix of the second symbol, and a useful symbol interval, corresponding to the sum of a useful symbol interval of the first symbol and a useful symbol interval of the second symbol. With the addition of the cyclic prefix of the first symbol and the cyclic prefix of the second symbol, the length of a cyclic prefix is increased twice. Accordingly, the time delay effect resulting from transmission by multiple points can be reduced. When the CoMP unit of the present embodiment is used, the overall throughput of the system is not reduced, but the influence of the Doppler effect may exist. It may be, therefore, efficient to apply the structure of a signal according to the present embodiment to low-speed UEs.

Figure 10:
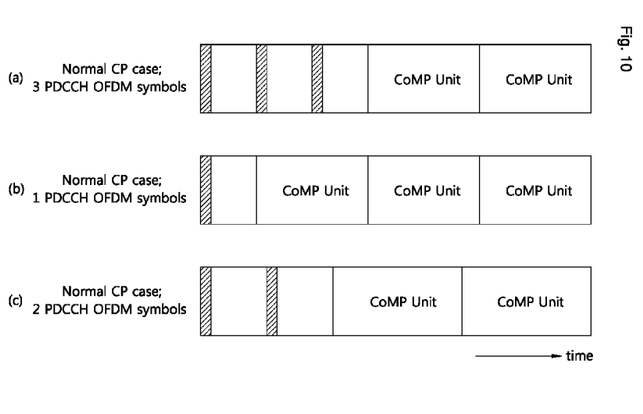
FIG. 10 shows an exemplary slot of 3GPP LTE/LTE-A to which the CoMP unit shown in FIG. 9 is applied.

FIG. 10 shows an exemplary slot of 3GPP LTE/LTE-A to which the CoMP unit shown in FIG. 9 is applied.

FIG. 10(a) shows an example in which 3 symbols are allocated to a control channel in the case of a normal cyclic prefix (CP). In the normal cyclic prefix (CP), one slot may have 7 symbols. Accordingly, two CoMP units shown in FIG. 9 may be inserted into four symbols other than a symbol for the control channel. FIG. 10(b) shows an example in which one symbol is allocated to a control channel in the case of a normal cyclic prefix (CP). Here, 3 CoMP units shown in FIG. 9 may be inserted into 6 symbols other than the control channel. FIG. 10(c) shows an example in which two symbols are allocated to a control channel in the case of an extended cyclic prefix (CP). In the case of the extended cyclic prefix, one slot may have 6 symbols. Accordingly, two CoMP units shown in FIG. 9 may be inserted into four symbols other than the control channel.

In other words, to guarantee backward compatibility, the number of inserted CoMP units, such as that shown in FIG. 9, may vary depending on the number of symbols allocated to the control channel. For the purpose of UEs not supported by CoMP resource regions, the number of inserted CoMP units may be defined such that a subframe having the CoMP unit allocated thereto can be designated as a special subframe, such as an MBSFN subframe, and UEs supported by CoMP resource regions can recognize the special subframe.

The example of FIG. 10 may be expanded to two or more slots. One subframe may have two slots. In general, a control channel exists in the first one of the two slots, but an additional control channel may be allocated to the second slot of the two slots in relation to a subframe used in LTE-A. In other words, the number of symbols allocated to the control channel of the first slot may be reduced, and additional symbols may be allocated to the control channel of the second slot. Accordingly, a control signal can be transmitted with reduced latency, and a supplementary operation mode may be performed.

Unlike in the example in which the control channel and the CoMP unit are allocated on a slot basis as shown in FIG. 10, the control channel and the CoMP unit may be allocated on a subframe basis. Here, if the control channel is allocated to only the first slot, the length of the control channel needs to be controlled such that there is no remaining symbol with the length of a CoMP unit taken into consideration. In the case of a normal cyclic prefix, one subframe includes 14 symbols. Accordingly, for example, the control channel may be allocated to two symbols of the first slot, and the remaining 12 symbols may be used as resources for CoMP units. Furthermore, in the case of an extended cyclic prefix, one subframe includes 14 symbols. Accordingly, the control channel may be allocated to the two symbols of the first slot, and the remaining 10 symbols may be used as resources for the CoMP units.

On the other hand, in a wireless communication system including a femto cell or a relay station which services a smaller coverage than a macro BS, the structure of a signal needs not to be changed as in the proposed method of the present invention. If the femto cell or the relay station is used, time delay resulting from signals transmitted by multiple points can be avoided by controlling points of time at which the respective signals are transmitted. In other words, a femto cell or a relay station existing in a macro cell may arbitrarily control timing in which downlink data are transmitted or timing in which uplink data are transmitted. In particular, in a wireless communication system including a relay station, a signal is transmitted through a backhaul link between a BS and the relay station. If timing in which a downlink signal is transmitted from a BS to a UE is not synchronized with timing in which a downlink signal is transmitted from the relay station to the UE, the amount of data that can be transmitted through the backhaul link is limited. Accordingly, the timing in which the downlink signal is transmitted from the BS to the UE and the timing in which the downlink signal is transmitted from the relay station to the UE need to be synchronized within a specific offset. Here, if the CoMP scheme is applied, a maximum delay time of a downlink signal from a macro BS and a downlink signal from a femto BS or a relay station corresponds to time as great as the diameter of a cell to which the femto BS or the relay station belongs.

Figure 11:
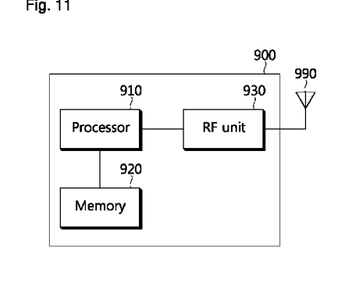
FIG. 11 is a block diagram of a transmitter in which the embodiments of the present invention are implemented.

FIG. 11 is a block diagram of a transmitter in which the embodiments of the present invention are implemented. The transmitter 900 includes a processor 910, memory 920, and a Radio Frequency (RF) unit 930.

Referring to FIG. 11, the processor 910 is configured to implement the proposed functions, processes, and/or methods. The processor 910 maps a first signal to a first OFDM symbol and transmits the first signal mapped to the first OFDM symbol, maps a second signal, having a phase θ shifted phase of the first signal, to a second OFDM symbol contiguous to the first OFDM symbol and transmits the second signal mapped to the second OFDM symbol, wherein the first signal and the second signal are transmitted in a same subcarrier in a frequency domain. The memory 920 is coupled to the processor 910 and is configured to store various pieces of information for driving the processor 910. The RF unit 930 is coupled to the processor 910 and is configured to transmit and/or receive a radio signal.

The processor 910 can include an Application-Specific Integrated Circuit (ASIC), other chipset, logic circuits and/or data processors. The memory 920 can include Read-Only Memory (ROM), Random Access Memory (RAM), flash memory, a memory card, a storage medium and/or other storage devices. The RF unit 930 can include a baseband circuit for processing radio signals. In the case in which the embodiments are implemented in software, the above schemes may be implemented using a module (process, function, etc.) for executing the above functions. The module may be stored in the memory 920 and executed by the processor 910. The memory 920 may be disposed inside or outside of the processor 910 and may be coupled to the processor 910 by well-known means.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method for transmitting data performed by at least one base station (BS) in a wireless communication system, the method comprising:

transmitting respective first signals of a first BS and a second BS, the respective first signals being mapped to a first Orthogonal Frequency Division Multiplexing (OFDM) symbol, and transmitting a second signal having a θ shifted phase of the first signal, by the first BS, the second signal being mapped to a second OFDM symbol, which is contiguous to the first OFDM symbol, wherein a frequency of a subcarrier in which the respective first signals and the second signal are transmitted is identical, wherein the shifted phase θ is determined based on the frequency of the subcarrier in which the respective first signals and the second signal are transmitted, and a length of a cyclic prefix (CP) applied to the first OFDM symbol and the second OFDM symbol, wherein a guard subcarrier, which is a neighboring subcarrier of the subcarrier in which the respective first signals and the second signal are transmitted, is allocated, and wherein the guard subcarrier carries a data symbol in the first OFDM symbol and a phase-modulated data symbol, which has a θ shifted phase of the data symbol, in the second OFDM symbol.

2. The method of claim 1, wherein the $\theta = 2\pi f_k t_{CP}$ or $-2\pi f_k t_{CP}$, where fk is the frequency of the subcarrier in which the respective first signals and the second signal are transmitted, and tCP is the length of the cyclic prefix applied to the first OFDM symbol and the second OFDM symbol.

3. The method of claim 1, further comprising:
transmitting the first signal of the second BS, by the second BS, the first signal of the second BS being mapped to the second OFDM symbol.

4. The method of claim 1, further comprising:
transmitting the second signal of the second BS, by the second BS, the second signal of the second BS being mapped to the second OFDM symbol.

5. The method of claim 1, wherein the respective first signals and the second signal are reference signals.

6. The method of claim 1, further comprising:
transmitting a data symbol mapped to the first OFDM symbol of the guard subcarrier; and
transmitting a phase-modulated data symbol mapped to the second OFDM symbol, the phase-modulated data symbol having a θ shifted phase of the data symbol.

7. A method of processing data performed by a user equipment in a wireless communication system, the method comprising:
receiving a first signal from a base station (BS) through a first Orthogonal Frequency Division Multiplexing (OFDM) symbol;
receiving a second signal, having a θ shifted phase of the first signal, from the BS through a second OFDM symbol contiguous to the first OFDM symbol, and
decoding the first signal and the second signal,
wherein a frequency of a subcarrier in which the first signal and the second signal are transmitted is identical,
wherein the shifted phase θ is determined based on the frequency of the subcarrier in which the first signal and the second signal are transmitted, and a length of a cyclic prefix (CP) applied to the first OFDM symbol and the second OFDM symbol,
wherein a guard subcarrier, which is a neighboring subcarrier of the subcarrier in which the first signal and the second signal are transmitted, is allocated, and
wherein the guard subcarrier carries a data symbol in the first OFDM symbol and a phase-modulated data symbol, which has a θ shifted phase of the data symbol, in the second OFDM symbol.

8. The method of claim 7, wherein the $\theta = 2\pi f_k t_{CP}$ or $-2\pi f_k t_{CP}$, where fk is the frequency of the subcarrier in which the first signal and the second signal are transmitted, and tCP is the length of the cyclic prefix applied to the first OFDM symbol and the second OFDM symbol.

9. The method of claim 7, wherein decoding the first signal and the second signal comprising:
setting a useful symbol interval within the first OFDM symbol and the second OFDM symbol; and
decoding data within the useful symbol interval.

10. The method of claim 9, wherein a length of the useful symbol interval is a length other than a cyclic prefix in the second OFDM symbol.

* * * * *